(No Model.)
E. P. PRICE.
NUT LOCK.
No. 270,119. Patented Jan. 2, 1883.
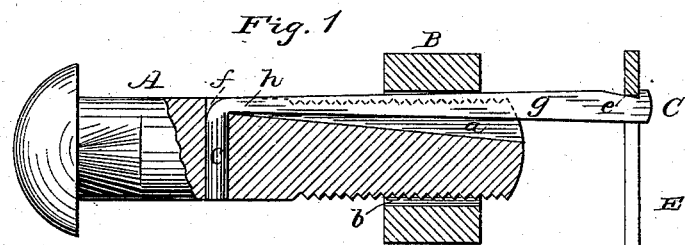
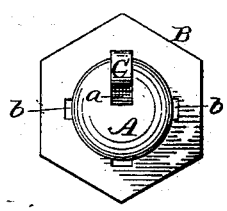
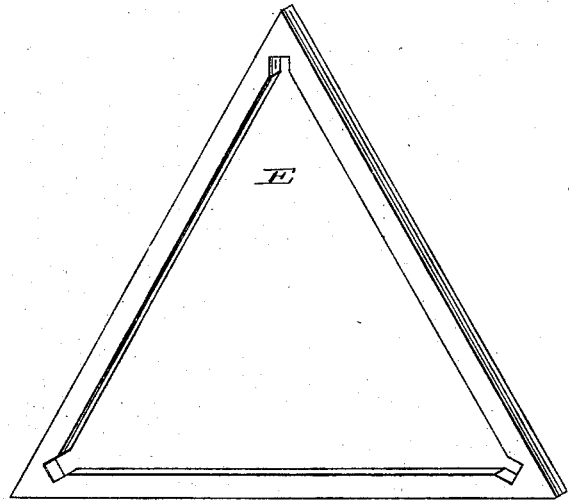
Witnesses:
H. N. Low
J. S. Barker.
Inventor:
Edward P Price
by Doubleday & Bliss
Attys.

UNITED STATES PATENT OFFICE.

EDWARD P. PRICE, OF CANTON, OHIO, ASSIGNOR OF ONE-HALF TO DUDLEY REED, OF SAME PLACE.

NUT-LOCK.

SPECIFICATION forming part of Letters Patent No. 270,119, dated January 2, 1883.

Application filed September 27, 1881. (No model.)

*To all whom it may concern:*

Be it known that I, EDWARD P. PRICE, a citizen of the United States of America, residing at Canton, in the county of Stark and State of Ohio, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a section of a bolt, a nut, and a lock embodying my improvement. Fig. 2 is an end view. Fig. 3 shows a device for holding the spring out of engagement with the nut.

In the drawings, A represents a bolt which, in the form shown, is adapted for use in fastening the plates to railroad-rails, though my improved locking device can be employed for other uses than that just mentioned.

$a$ represents a groove formed in the side of the bolt, and extending from a point somewhat nearer the head of the bolt than the inner end of the screw-thread. It gradually increases in depth from the inner end to the outer, for a purpose that will hereinafter appear, and at the inner end it terminates in an aperture, $f$, which passes transversely through the bolt.

B represents a nut adapted to engage with the thread upon the bolt A, and provided with two or more grooves or slots, $b$, lying substantially parallel to the axis of the nut.

C is the locking-spring. It is formed of a piece of strong steel as small as possible without reducing its strength too much. At the inner end it is formed with an arm, $c$, substantially at right angles to the shank $g$, said arm being seated, when the lock is in position, in the aperture $f$ of the bolt A. The shank $g$ is somewhat thinner at the inner end, as at $h$, than at the outer portion, in order that the said thinner part may operate as a spring to throw the outer part away from the center of the bolt. When the outer end of the spring is depressed it can be forced entirely below the threads of the bolt, and when in this position the nut can be turned freely to and fro upon the bolt. After the nut has been adjusted in the desired position the spring is released, and it is immediately thrown outward to engage with one of the grooves $b$ in the nut B. The outer end of the spring extends beyond the end of the bolt, and is formed with a notch, $e$. By means of this notched projecting portion the spring can be readily forced inward out of engagement with it. By means of a ring, or of a device similar to that shown at E, Fig. 3, adapted to fit the operator's foot, and adapted also to engage with the notch $e$, the operator can release the spring in such manner as to have both hands free for the purpose of turning up the nut, and in this way the nuts along a railroad-track can be very rapidly tightened, and it can be done with greater power than when use is made of the spring-fastenings heretofore employed.

I am aware that nut locks have been made in which the bolt has a longitudinal slot adapted to receive a longitudinal spring engaging with the inner surface of the next, and that such springs have been made with projecting ends, by which they may be pressed inward that the next may be turned; and I do not claim such devices as my invention, which consists in the mode of securing the spring in the bolt, and in the combination, with such a spring adapted to receive it, of a device for more conveniently operating the spring.

When a detachable spring of this character is secured by letting an arm of it perpendicularly into the bolt it is essential that the aperture for this arm should pass entirely through the bolt to afford means for pushing the spring out if its arm should become jammed or rusted in the aperture, in which it is designed to fit snugly. It will readily be seen that a pull upon the free end of the spring would have no effect to release the arm $c$, and without the means I have provided there is great inconvenience in separating the detachable spring from the bolt.

I am aware that bolts have been constructed having an aperture extending entirely through the bolt, and I do not claim such construction, broadly; but I am not aware that they have ever been used for the purpose for which I have employed them—viz., to form the seat for a detachable and non-malleable spring, as shown, enabling me to detach said spring without bending it by the application of a direct thrust to the seated end.

What I claim is—

The combination, with the slotted bolt and longitudinal spring secured therein, projecting therefrom and having the notch e in its end, of the foot-stirrup E, adapted to engage with the notch e in the end of said spring, whereby the spring may be released from the nut, substantially as set forth.

In testimony whereof I affix my signature in presence of two witnesses.

EDWARD P. PRICE.

Witnesses:
HENRY FISHER,
J. P. FAWCETT.